(12) United States Patent
Liu et al.

(10) Patent No.: US 12,448,331 B2
(45) Date of Patent: Oct. 21, 2025

(54) ORGANIC SILICON NANO-PRECURSOR MEDIUM TRANSMISSION INHIBITOR, ITS PREPARATION METHOD AND USE

(71) Applicants: Sobute New Materials Co., Ltd., Jiangsu (CN); Bote New Materials Taizhou Co., Ltd., Jiangsu (CN)

(72) Inventors: Jiaping Liu, Nanjing (CN); Jingshun Cai, Nanjing (CN); Song Mu, Nanjing (CN); Jianzhong Liu, Nanjing (CN); Xiaocheng Zhou, Nanjing (CN); Qi Ma, Nanjing (CN); Pengcheng Wu, Nanjing (CN); Jinxiang Hong, Nanjing (CN)

(73) Assignees: Sobute New Materials Co., Ltd., Nanjing (CN); Bote New Materials Taizhou Co., Ltd., Taizhou (CN)

( * ) Notice: Subject to any disclaimer, the term of this patent is extended or adjusted under 35 U.S.C. 154(b) by 427 days.

(21) Appl. No.: 18/013,270

(22) PCT Filed: Jun. 30, 2020

(86) PCT No.: PCT/CN2020/099414
§ 371 (c)(1),
(2) Date: Dec. 28, 2022

(87) PCT Pub. No.: WO2022/000305
PCT Pub. Date: Jan. 6, 2022

(65) Prior Publication Data
US 2024/0327285 A1    Oct. 3, 2024

(30) Foreign Application Priority Data

Jun. 29, 2020 (CN) .......................... 202010609890.1

(51) Int. Cl.
| | | |
|---|---|---|
| C04B 24/42 | (2006.01) | |
| C04B 24/28 | (2006.01) | |
| C04B 24/38 | (2006.01) | |
| C04B 103/10 | (2006.01) | |
| C04B 103/40 | (2006.01) | |
| C04B 103/61 | (2006.01) | |

(52) U.S. Cl.
CPC ............ *C04B 24/42* (2013.01); *C04B 24/287* (2013.01); *C04B 24/383* (2013.01); *C04B 2103/105* (2013.01); *C04B 2103/402* (2013.01); *C04B 2103/404* (2013.01); *C04B 2103/406* (2013.01); *C04B 2103/408* (2013.01); *C04B 2103/61* (2013.01)

(58) Field of Classification Search
CPC ..... C04B 24/42; C04B 24/287; C04B 24/383; C04B 2103/105; C04B 2103/402; C04B 2103/404; C04B 2103/406; C04B 2103/408; C04B 2103/61; C04B 2103/65; C04B 2111/26; C04B 28/02; C04B 40/0039; C04B 28/04; C04B 2111/20; C04B 2111/27; C08L 83/04; Y02W 30/91
See application file for complete search history.

(56) References Cited

FOREIGN PATENT DOCUMENTS

| | | |
|---|---|---|
| CA | 2300614 A1 | 9/2000 |
| CN | 1513936 A | 7/2004 |
| CN | 101358014 A | 2/2009 |
| CN | 102105545 A | 6/2011 |
| CN | 109504270 A | 3/2019 |
| EP | 0273867 A2 | 7/1988 |
| JP | 60215778 A | 10/1985 |
| JP | 2002508426 A | 3/2002 |
| JP | 2010525157 A | 7/2010 |
| JP | 2011529130 A | 12/2011 |
| JP | 2017509730 A | 4/2017 |
| WO | 2015059238 A1 | 4/2015 |

OTHER PUBLICATIONS

International Search Report (PCT/CN2020/099414); Date of Mailing: Dec. 11, 2020.
Japanese Office Action for Application No. 2022-581579, mailed Feb. 6, 2024 (10 pages).

*Primary Examiner* — Anthony J Green
(74) *Attorney, Agent, or Firm* — Wiersch Law Group

(57) ABSTRACT

The present disclosure discloses an organic silicon nano-precursor medium transmission inhibitor and its preparation method and use. The organic silicon nano-precursor medium transmission inhibitor is composed of an organic silicon and its derivatives, a catalyst, a dispersant, a stabilizer, a surfactant, and water. The organic silicon nano-precursor medium transmission inhibitor in-situ generates nanoparticles during a hydration process. The nanoparticles not only have a hydrophobic function, but also can effectively fill the pores of the concrete, which effectively solves a problem in which a hydrophobic material in a state of full water cannot reduce the diffusion of an erosive medium. The problems such as uneven dispersion and poor stability of nanoparticles added can be effectively solved by in-situ generating the nanoparticles, thereby effectively improving the ion corrosion resistance performance of the concrete.

7 Claims, No Drawings

ORGANIC SILICON NANO-PRECURSOR MEDIUM TRANSMISSION INHIBITOR, ITS PREPARATION METHOD AND USE

CROSS-REFERENCE TO RELATED APPLICATION

The present application claims priority to Chinese Patent Application entitled with "ORGANIC SILICON NANO-PRECURSOR MEDIUM TRANSMISSION INHIBITOR, ITS PREPARATION METHOD AND USE", filed on Jun. 29, 2022, the content of which is incorporated herein by reference in its entirety.

TECHNICAL FIELD

The present disclosure relates to a functional material, which is particularly suitable for inhibiting transmission of corrosive media in concrete and belongs to the field of building materials.

BACKGROUND

Corrosion destruction of reinforced concrete is increasing, which will cause major safety accidents in severe cases. Engineering and technical personnel around the world have always been concerned about the improvement of corrosion resistance of reinforced concrete. Especially with the rapid development of the economic society, the continuous widening of engineering application fields, severe corrosive environment is becoming more and more common, additional measure of practical and long-term corrosion resistance is an effective means to reduce corrosion destruction and delay structural service life.

The key to improving concrete durability is to reduce the transmission of corrosive medium in concrete. Conventional technical means include reducing water-binder ratio and using mineral admixtures. Reducing water-binder ratio and reducing water amount will greatly affect workability of fresh concrete. The use of mineral admixtures such as fly ash, mineral powder, and silicon ash may result in a lower early intensity of concrete, exacerbate carbonization depth, and increase the risk of shrinkage and cracking. The above conventional technical means are mainly approach of reducing the transmission of corrosive ions by means of reducing the number of pores and optimizing pore structures. The existing studies have shown that the most severe corrosion area of reinforced concrete is an area of alternation of wetting-drying and splash spraying. The main reason is that the capillary water absorption phenomenon similar to the "wick effect" exists in the above areas, and the water absorption of the capillary will drive the rapid transmission and enrichment of erosive ions. Therefore, reducing the capillary water absorption becomes the key to inhibit the medium transmission in the most severe corrosion site.

Generally, the technical means of lowering capillary water absorption are divided into external coating protective coating or internal doping medium transmission inhibitory materials. Known surface protective coating technology includes organic silane penetration protective coating and film-forming protective coating (EP-B0538555, EP-B0340816). The organic silicon emulsion can be painted on the surface of the concrete, forming a hydrophobic layer on the surface of the concrete to prevent the corrosive medium from transmitting to the concrete. However, the uniformity of surface brushing and deterioration of the performance after long-term use may both reduce the medium transmission inhibitory performance.

Other external coating anticorrosive materials, including acrylate, epoxy resin, etc. can completely isolate the corrosive medium, but the biggest problem with this type of anticorrosive coatings and concrete is poor adhesion, prone to aging, and airtight, so that protective materials have insufficient durability on the surface of the concrete, and it is difficult to remove them from the surface of the structure after failure.

Internal doping hydrophobic materials in concrete can play a role in inhibiting transmission of corrosive media. In recent years, it has gradually received research and attention from scholars and engineering technicians. However, the existing internal doping hydrophobic material itself has a significant negative impact on the strength of concrete. For example, the stearic acid emulsion can generally reduce the strength of concrete by 15-30% (Construction and building materials 227 (2019) 11678), which laid hidden dangers for guarantee of mechanical properties.

Although CN 1106363C mentioned that a hydrolyzable aqueous emulsion containing organic silicon compounds was added into an unsolidified fresh concrete made of water, inorganic components and selective organic components to prepare a uniform waterproof concrete, which can inhibit the transmission of corrosive media to some degree. However, in a state of complete full water in concrete, the diffusion of such materials on the erosive media has almost no improvement effect, and sometimes it will increase the diffusion of corrosive ions in the concrete under the state of full water, which cannot achieve the effect of inhibiting medium transmission.

CN1233774C, CN102424542A, etc. have reported a nano-silicon waterproofing agent, which has following composition: sodium methamphetamine or sodium methylsilanol or high boiling sodium silanol, nano silicon dioxide, silicone acrylic emulsion or styrene acrylic emulsion or pure propyl emulsion, monoethanolamine or diethanolamine, or triethanolamine, and deionized water. However, waterproof materials such as sodium methamphetamine and the like will seriously affect the condensation time of the concrete, resulting in very limited actual dosage in the application, and it is difficult to achieve efficient hydrophobic effects in the state of full water. In addition, adding nano-materials to the concrete can also reduce the diffusion of the medium in the concrete under the state of full water to a certain extent. However, due to the poor stability of nanomaterials themselves and the difficulty of effective and uniform dispersion in concrete mixing, the practical application effect of nano-materials is still not ideal.

SUMMARY

In order to overcome the defects of the related art, the present disclosure provides a nano-precursor material, which improves the effect of the ion corrosion resistance performance of the concrete. The organic silicon nano-precursor medium transmission inhibitor in-situ generates nanoparticles during a hydration process. The nanoparticles not only have a hydrophobic function, but also can effectively fill the pores of the concrete, which effectively solves a problem in which a hydrophobic material in a state of full water cannot reduce the diffusion of an erosive medium.

In addition, the problems such as uneven dispersion and poor stability of nanoparticles added can be effectively solved by in-situ generating the nanoparticles in pores of the concrete.

The organic silicon nano-precursor medium transmission inhibitor provided by the present disclosure is composed of an organic silicon and its derivatives, a catalyst, a dispersant, a stabilizer, a surfactant, and water, which have following parts by weight:

the organic silicon and its derivatives: 2-70 parts,
the catalyst: 0.01-10 parts,
the dispersant: 0.01-10 parts,
the stabilizer: 0.01-5 parts,
the water: 30-95 parts;
the organic silicon and its derivatives are polymers having a silicon atom of 1 to 1,000, a linear or branch chain structure, a molecular weight of 100-100000, and are selected from silicate ester, alkyl silicate, alkyl siloxane, alkenyl siloxane, and alkyl siloxane with a functional heteroatom or polysiloxane with a functional heteroatom.

The catalyst is any one of phenol and its derivatives, benzoquinone and its derivatives, organic guanidine and their derivatives, and small molecule alcohol amine with a molecular weight of 50-1000.

The dispersant is a polymer dispersant formed by any one or two of acrylic acid and its derivatives, maleic acid and its derivatives, fumaric acid and its derivatives.

The stabilizer is polysaccharide, chitosan, cellulose ether, polyamide, or polypyrrolidone.

For some organic silicon and its derivatives, due to their poor solubility in the water, a surfactant is required to be added for operations such as emulsification and microemulsification, which enhances multiphase dispersity of organic silicon and its derivatives. The surfactant is a cation surfactant, an anion surfactant and non-ion surfactants with a HLB value of 5-14, and is specifically Span, Tween, isomeric alcohol ether, alkyl carboxylate, alkyl sulfonate, alkyl quaternary ammonium salt and the like. Preferred surfactant is a mixture of one or two of Span, alkyl carboxylate, and alkyl quaternary ammonium salt.

Preferably, the organic silicon and its derivatives are γ-aminopropyl siloxane, silane oligomer, and allyl triethoxy silane.

Preferably, the catalyst is phosphoguanidine and p-benzoquinone.

Preferably, the dispersant has a molecular weight of 1000-40000.

Because of its own performance characteristics, organic silicon has a low interfacial tension, which can effectively inhibit the infiltration of moisture and erosive media, thereby generating the effect of hydrophobic and inhibiting medium transmission. Meanwhile, organic silicon function groups and inorganic materials, especially concrete materials, have similar chemical composition, which can form a firm chemical bond at the interface of inorganic cement-based materials, thereby forming an organic/inorganic hybrid system to improve the surface physical and chemical properties of inorganic materials.

The catalysts have a role under the stimulation of the strong alkaline environment of the concrete, initiating the reactions between silicon and its derivative and hydrated silicate generated by cement hydration, organic/inorganic hybrid nanomaterials are generated in situ in the pores of the concrete. The nanomaterials are composed of oxygen, silicon, carbon and other elements.

The prominent features of the present disclosure are that the pH value of the prepared nano-precursor medium transmission inhibitor product system is proximal neutral, the catalyst does not initiate the reaction of silicon and its derivative in the product system of proximal neutral, and when mixed into the concrete, the catalyst initiates the reaction under strong basicity caused by cement hydration in the concrete environment to generate in situ hydrophobic nanoparticles.

The present disclosure introduces a dispersion component, on the one hand, which enables the nano-precursor medium to evenly disperse inside the concrete; on the other hand, the dispersion component can promote the nanoparticles generated by the reaction between the organic silicon nano-precursor and the cement hydration product during the hydration process to be dispersed more evenly.

The most significant feature of the present disclosure is that it is not just to improve the performance of concrete through simpler organic silicon, but through combinations such as different catalysts, dispersers, stabilizers, and surfactants, which can make organic silicon and its derivatives evenly distributed in concrete evenly, meanwhile, with concrete hydration inside the concrete, a hydration reaction is involved to generate in situ hydrophobic nanoparticles, while the dense performance of the concrete is improved.

Meanwhile, the nano-precursor of the present disclosure further includes stabilizer components. On the one hand, the stability of organic silicon and its derivatives in aqueous solution system is improved, on the other hand, the stability of nanoparticles after the reaction between organic silicon and its derivatives with hydration products is improved.

A preparation method of the organic silicon nano-precursor medium transmission inhibitor includes:
adding the organic silicon and its derivatives and the dispersant to a reactor to heat to 10-200° C.; if the surfactant exists, adding the surfactant while stirring for 1-24 h; and adding the catalyst, the stabilizer and water while further stirring for 1-24 h.

In an application method of the organic silicon nano-precursor medium transmission inhibitor in the present disclosure, it is added during the mixing process of a cement-based material, and its doping amount added in the cement-based material relative to a cementitious material consumption is 3-50 L/m$^3$, a dense dielectric transmission resistant material is formed after the cement-based material is hardened.

DESCRIPTION OF EMBODIMENTS

In order to better explain the beneficial effects of the present disclosure, the present disclosure is analyzed by Examples. Six samples of Examples are prepared, and the better Dow SHP 60 on the market is selected to perform a comparative research through concrete performance and dielectric transmission resistant performance test.

The proportions of specific Examples S1-S6 can be referred to Table 1 to be continued and continued Table 1

TABLE 1

Proportion of the sample

| Sample | γ-aminopropyl siloxane | silane oligomer (QX-1270) | allyl triethoxy silane | phosphoguanidine | p-benzoquinone | Sodium polyacrylate (Molecular weight, 10000~20000) | fumaric acid polymer (Molecular weight, 1000~3000) |
|---|---|---|---|---|---|---|---|
| S1 | 10 | | | | 0.5 | | 10 | |
| S2 | | 50 | | | 0.02 | | | 5 |
| S3 | | | 30 | | 0.2 | | 0.5 | |
| S4 | 40 | | | | | 0.5 | | 2 |
| S5 | | 70 | | | 1 | | 2 | |
| S6 | | | | 6 | | 0.01 | | 10 |

| Polypyrrolidone (Molecular weight, 2000~4000) | chitosan | Span 80 | Dodecyl trimethyl ammonium chloride | cellulose ether | water |
|---|---|---|---|---|---|
| 1 | | | 0.1 | | 78.5 |
| | 5 | 1.2 | | | 38.78 |
| | | 0.1 | | 3 | 66.3 |
| | | | 0.1 | 0.2 | 57.2 |
| | 0.9 | 3.0 | | | 23.1 |
| | 0.02 | 0.2 | | | 83.77 |

Table 1 is the proportions of the samples prepared. Through different combinations of compositions and proportions, the nano-precursor with stable performance is prepared, and then is blended into a concrete, the proportions of the concrete can be seen from Table 2.

TABLE 2

Proportions of the concrete kg/m³

| No. | Hailuo PO 42.5 | Fly ash Grad I | Mineral powder S95 | Sand River sand | Small stone Basalt 5-10 | Big stone Basalt 10-20 | Water Tap water | Medium transmission inhibitor | Types of samples |
|---|---|---|---|---|---|---|---|---|---|
| 1 | 270.8 | 125.2 | 21.2 | 648.8 | 506.8 | 507.6 | 146.8 | / | / |
| 2 | 270.8 | 125.2 | 21.2 | 648.8 | 506.8 | 507.6 | 146.8 | 5 | S1 |
| 3 | 270.8 | 125.2 | 21.2 | 648.8 | 506.8 | 507.6 | 146.8 | 15 | S2 |
| 4 | 270.8 | 125.2 | 21.2 | 648.8 | 506.8 | 507.6 | 146.8 | 6 | S3 |
| 5 | 270.8 | 125.2 | 21.2 | 648.8 | 506.8 | 507.6 | 146.8 | 6 | S4 |
| 6 | 270.8 | 125.2 | 21.2 | 648.8 | 506.8 | 507.6 | 146.8 | 3 | S5 |
| 7 | 270.8 | 125.2 | 21.2 | 648.8 | 506.8 | 507.6 | 146.8 | 40 | S6 |
| 8 | 270.8 | 125.2 | 21.2 | 648.8 | 506.8 | 507.6 | 146.8 | 3 | SHP 60 |

The influences of different samples on the workability, mechanical properties, hydrophobic properties and chloride ion diffusion resistance of the concrete were compared and studied. The water absorption rate was tested by referring to BS1882, and the chloride ion diffusion coefficient was tested by referring to RCM method of the electromigration chloride ion diffusion coefficient in GB50082 "Test Method for Long-Term Durability of Ordinary Concrete". The test results were shown in Table 3.

TABLE 3

Influence of different samples on performance of the concrete

| No. | Gas content % | Bulk density kg/m3 | Slump mm | Extension Mm | Strength/MPa 7 | Strength/MPa 28 | Strength/MPa 56 | Water absorption 7 d | diffusion coefficient of chloride ion 28 d |
|---|---|---|---|---|---|---|---|---|---|
| 1 | 3.5 | 20.380 | 210 | 730 | 40.2 | 50.7 | 58.5 | 1.98 | 6.64 |
| 2 | 3.0 | 20.380 | 220 | 690 | 41.2 | 54.7 | 60.5 | 0.67 | 6.21 |
| 3 | 2.1 | 20.570 | 241 | 685 | 42.6 | 55.6 | 59.9 | 0.52 | 4.71 |
| 4 | 2.3 | 20.560 | 220 | 705 | 44.0 | 61.4 | 65.8 | 0.50 | 4.98 |
| 5 | 1.3 | 20.610 | 225 | 675 | 43.8 | 61.8 | 63.0 | 0.37 | 4.35 |
| 6 | 1.5 | 20.585 | 232 | 700 | 43.4 | 60.3 | 65.0 | 0.42 | 5.67 |
| 7 | 1.5 | 20.64 | 242 | 695 | 45.6 | 66.2 | 71.1 | 0.45 | 5.19 |
| 8 | 1.0 | 20.60 | 220 | 660 | 40.9 | 59.2 | 64.6 | 0.73 | 6.69 |

The test results show that the addition of organic silicon nano-precursor medium transmission inhibitor has little impact on the working performance and mechanical properties of concrete, and can effectively reduce the water absorption rate of concrete. Compared with the same type of organic silicon waterproof agent, the hydrophobic property is stronger, even under the state of full water, it can significantly reduce the chloride ion diffusion coefficient and enhance the ion erosion resistance of concrete.

What is claimed is:

1. An organic silicon nano-precursor medium transmission inhibitor, consisting of an organic silicon and its derivatives, a catalyst, a dispersant, a stabilizer, a surfactant, and water, which have following parts by weight:

the organic silicon and its derivatives: 2-70 parts,
the catalyst: 0.01-10 parts,
the dispersant: 0.01-10 parts,
the stabilizer: 0.01-5 parts, and
the water: 30-95 parts;

wherein the organic silicon and its derivatives are compounds have a linear or branch chain structure with 1 silicon atom to 1,000 silicon atoms, and the compounds have a molecular weight of 100-100000, and wherein the compounds are selected from silicate ester, alkyl silicate, alkyl siloxane, alkenyl siloxane, and alkyl siloxane with a functional heteroatom or polysiloxane with a functional heteroatom;

wherein the catalyst does not initiate a reaction in a neutral environment, and initiates a reaction after the organic silicon nano-precursor medium transmission inhibitor is blended into a concrete, and wherein the catalyst is any one of phenol and its derivatives, benzoquinone and its derivatives, guanidine and its derivatives, and small molecule alcohol amine with a molecular weight of 50-1000;

wherein the dispersant is a polymer dispersant formed by any one or two of acrylic acid and its derivatives, maleic acid and its derivatives, fumaric acid and its derivatives; and wherein the stabilizer is polysaccharide, chitosan, cellulose ether, polyamide, or polypyrrolidone.

2. The organic silicon nano-precursor medium transmission inhibitor according to claim 1, wherein a surfactant is further added to the organic silicon nano-precursor medium transmission inhibitor; wherein the surfactant is a cationic surfactant, an anionic surfactant and a non-ionic surfactant, the surfactant has a HLB value of 5-14, and the surfactant is selected from a combination consisting of any one or more of anhydrosorbitol fatty acid ester, polyoxyethylene anhydrosorbitol fatty acid ester, isomeric alcohol ether, alkyl carboxylate, alkyl sulfonate, and alkyl quaternary ammonium salt in any proportion.

3. The organic silicon nano-precursor medium transmission inhibitor according to claim 2, wherein the surfactant is a mixture of one or two of anhydrosorbitol fatty acid ester, alkyl carboxylate, and alkyl quaternary ammonium salt.

4. The organic silicon nano-precursor medium transmission inhibitor according to claim 1, wherein the organic silicon and its derivatives are γ-aminopropyl siloxane, silane oligomer, and allyl triethoxy silane.

5. The organic silicon nano-precursor medium transmission inhibitor according to claim 1, wherein the catalyst is phosphoguanidine or p-benzoquinone.

6. The organic silicon nano-precursor medium transmission inhibitor according to claim 1, wherein the dispersant has a molecular weight of 1000-40000.

7. A method for preparing the organic silicon nano-precursor medium transmission inhibitor according to claim 1, comprising following steps:

adding the organic silicon and its derivatives and the dispersant to a reactor to heat to 10-200° C.; adding the surfactant as required while stirring for 1-24 h; adding the catalyst, the stabilizer and the water while further stirring for 1-24 h, to obtain the organic silicon nano-precursor medium transmission inhibitor.

* * * * *